A. W. DAWLEY.
Centrifugal Honey-Extractor.

No. 164,531. Patented June 15, 1875.

Witnesses.
E. H. Bates
G. E. Upham

Inventor
Ananias W. Dawley
Chipman, Hosmer & Co.
Attorneys

UNITED STATES PATENT OFFICE.

ANANIAS W. DAWLEY, OF MANKATO, MINNESOTA.

IMPROVEMENT IN CENTRIFUGAL HONEY-EXTRACTORS.

Specification forming part of Letters Patent No. 164,531, dated June 15, 1875; application filed April 25, 1874.

*To all whom it may concern:*

Be it known that I, ANANIAS W. DAWLEY, of Mankato, in the county of Blue Earth and State of Minnesota, have invented a new and valuable Improvement in Honey-Extractors; and I do hereby declare that the following is a full, clear, and exact description of the construction and operation of the same, reference being had to the annexed drawings, making a part of this specification, and to the letters and figures of reference marked thereon.

Figure 1:
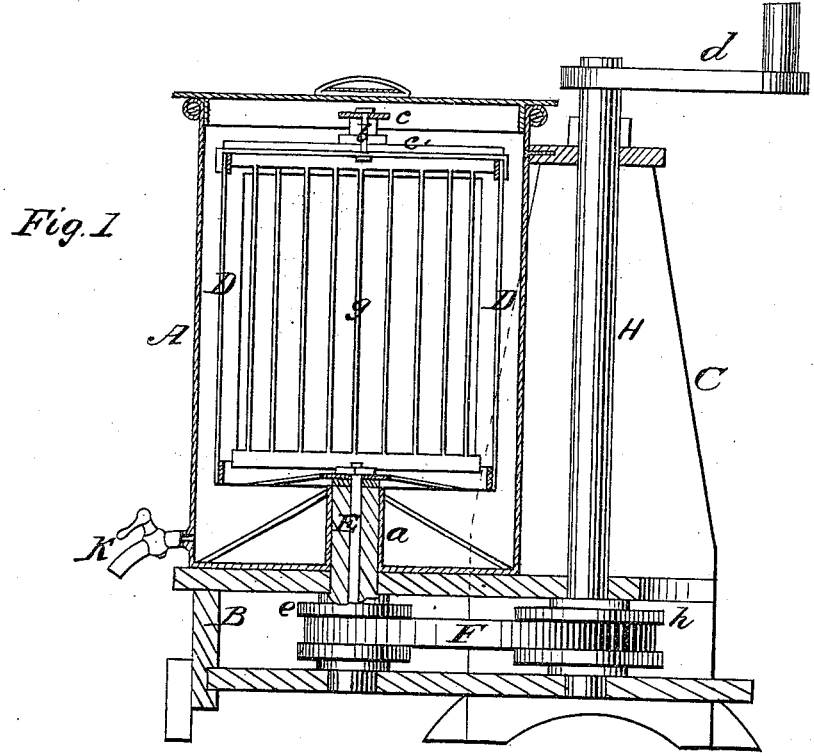
Figure 2:
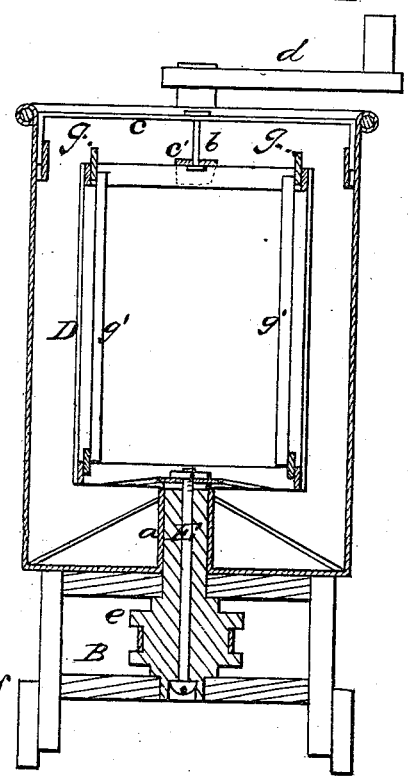
Figure 3:
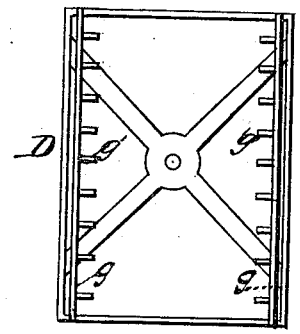

Figure 1 of the drawing is a representation of a longitudinal vertical section of my honey-extractor, and Fig. 2 is a transverse vertical section of the same. Fig. 3 is a detailed view.

This invention has relation to apparatus which are designed for extracting honey by centrifugal force from the comb; and the novelty consists in the construction and arrangement of the parts, as will be hereinafter more fully described and claimed.

In the annexed drawings, A designates a vessel of suitable size and form, and B designates a stand on which this vessel is secured, from which stand two posts, C, rise, and are connected together at their upper ends. D represents an open basket or cage of rectangular form, which is composed of vertical and horizontal bars rigidly secured together. This basket is rigidly secured to the upper end of a shaft, E, which passes vertically and centrally through the bottom of the vessel A, and is surrounded by a tube, $a$, which will prevent the escape of the honey without the use of a packing for said shaft. The basket is centered at its upper end by a pivot, $b$, which turns in two removable cross-bars, $c\ c'$, one of which is attached to the basket, and the other to the vessel A. The basket is provided with removable racks $g\ g$, pivoted with vertical slats $g'\ g'$, between which the combs are applied.

It will be seen by this construction that the movable comb-frames are secured in their proper location in the rack, and are properly spaced during the rotation of the basket, while at the same time the entire rack containing the comb-frames may be removed bodily from the basket when the honey is extracted, and the comb-frames may be removed and others substituted for them.

On the shaft E, below the vessel A, a pulley, $e$, is secured, around which passes a belt, F, which is also carried around a pulley, $h$, on the lower end of a vertical shaft, H. This shaft rises alongside of the vessel A, and has its bearings in cross-pieces of the posts C'. $d$ is a crank on the upper end of shaft H, by turning which the basket D will receive a rapid rotary motion.

By thus rapidly rotating the basket in the vessel A, the honey is expelled by centrifugal force, and will force to the bottom of the vessel A, from which it may be drawn by means of a cock, K. When the combs are emptied they can be readily removed from the basket and returned to the hive.

I am well aware that a machine for extracting honey by centrifugal force from the comb, also removable frames for holding the honey-combs while in the machine, as shown in the patents of H. O. Peabody, dated October 26, 1869, and December 7, 1869, are not new, and therefore I do not claim such invention, broadly.

What I claim, and desire to secure by Letters Patent, is—

The removable racks $g\ g$, having slats $g'\ g'$ projecting inward to secure the proper transverse location and spacing of the comb-frames, and at the same time to facilitate their removal, in combination with the rotary basket D and the outer stationary vessel A, provided with the cock K, substantially as and for the purpose set forth.

In testimony that I claim the above I have hereunto subscribed my name in the presence of two witnesses.

ANANIAS W. DAWLEY.

Witnesses:
 WILLIAM C. DURKEE,
 L. S. DAVIES.